Aug. 14, 1934.    J. C. KORTH ET AL    1,970,145
APPARATUS FOR BURNING LIQUID FUEL
Filed April 7, 1930    2 Sheets-Sheet 2
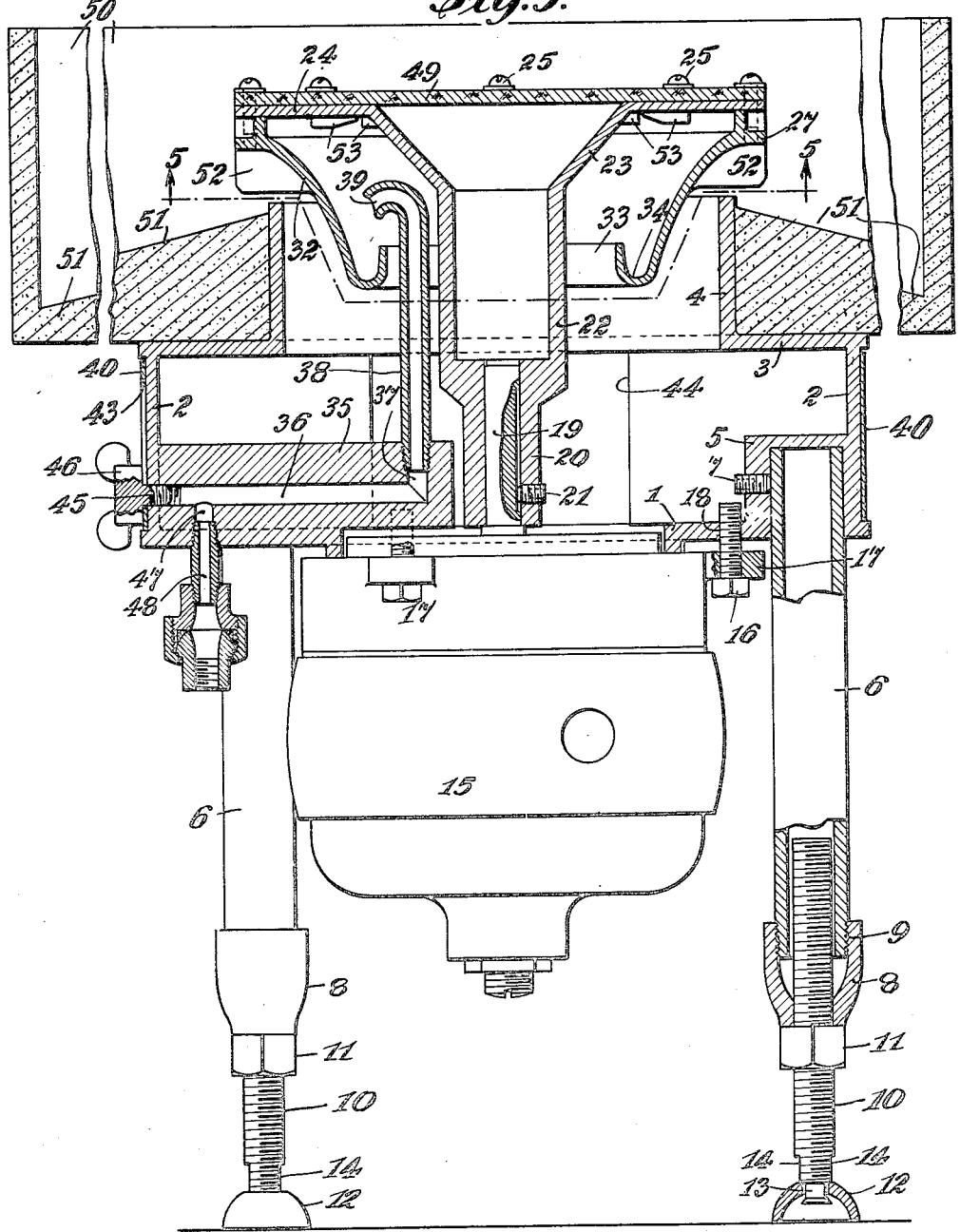

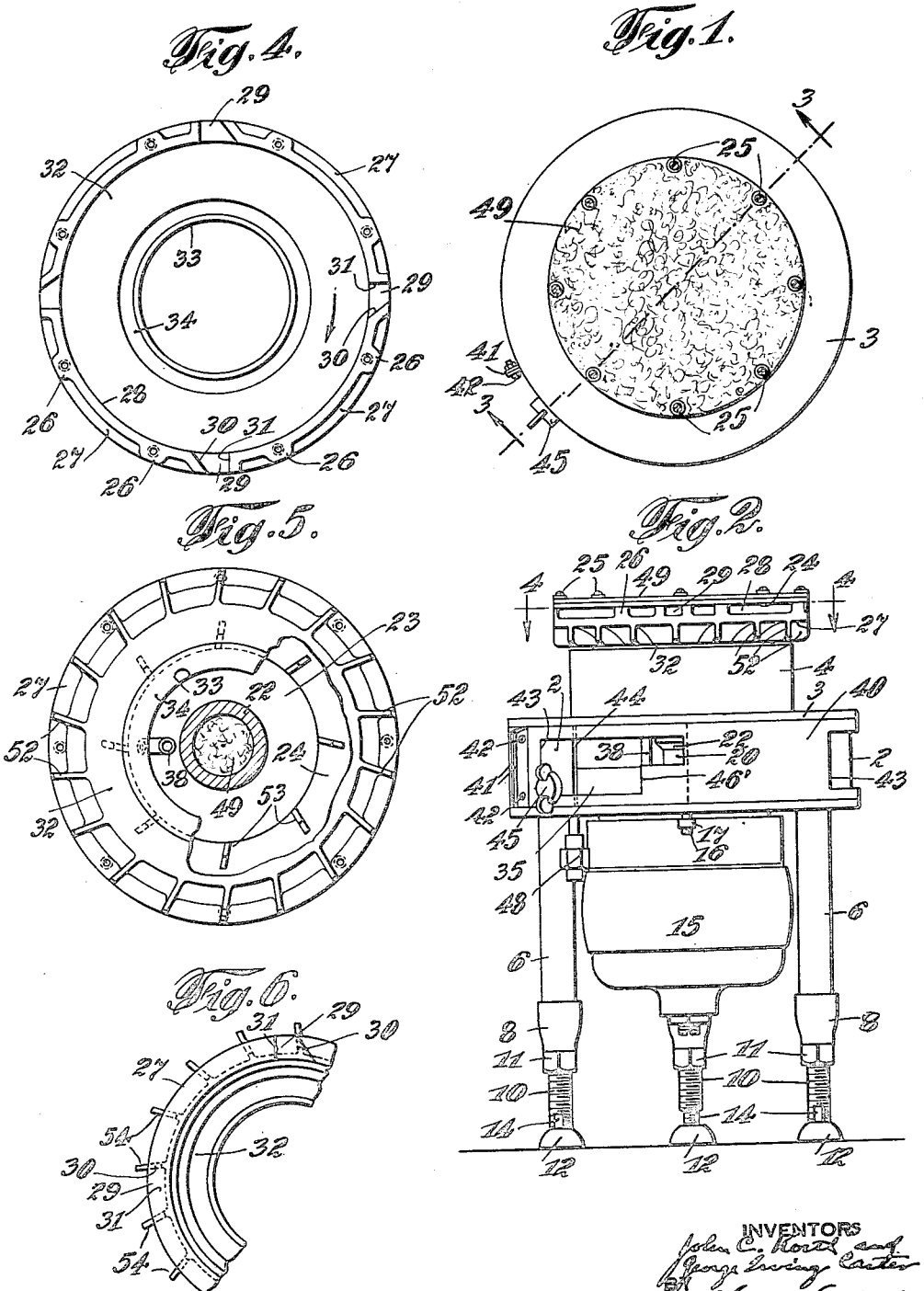

UNITED STATES PATENT OFFICE 1,970,145

APPARATUS FOR BURNING LIQUID FUEL

John C. Korth, Maplewood, N. J., and George Irving Carter, New York, N. Y.; said Carter assignor to said Korth Application April 7, 1930, Serial No. 442,089

2 Claims. (Cl. 158—77)

This invention relates to an oil burner of the type involving the centrifugal discharge of liquid fuel spray and air.

One of the objects of our invention is to provide an oil burner which is efficient, dependable and economical.

A further object of our invention is to provide an oil burner of the character referred to, which is extremely simple, sturdy and durable, and is so organized that those parts whose smoothness or dependability of operation are subject to being impaired when subjected to an appreciable degree of heat, are so shielded and protected against being heated by the combustion of the burner that their function and utility is safeguarded.

A further object of our invention is to provide an oil burner of the character referred to, in which premature vaporization of the liquid fuel is prevented.

A further object of our invention is to provide an oil burner of the character referred to, which comprises a minimum number of parts, and which may be assembled and knocked down very quickly and easily.

Included in the objects mentioned hereinabove, are the more specific objects of providing an improved manner of associating a driving motor with a centrifugal oil burner and its rotatable head whereby mechanical bearings between the head and the drive shaft of the motor are eliminated, and an extremely simple mounting is obtained; also permitting the ready and easy adjustment of the rotating burner head on the motor shaft; also the more specific object of providing an extremely simple and economical body member for the burner, including an oil duct construction that is rigid, easily cleaned and does not require pipe fittings; and also the more specific object of providing an extremely simple, efficient and easily adjustable shutter for the air inlet ports of the burner, and the provision of a single screw which has the three-fold function of serving as a removable plug for an oil duct of the burner body member, of serving as limiting means for the shutter, and also serving as a device whereby the shutter may be locked in adjusted position.

Other objects of this invention will be in part obvious and in part pointed out hereinafter.

The invention accordingly consists in the features of construction, combinations of elements and arrangements of parts, all of which will be more fully pointed out hereinafter, and the scope of the application of which will be indicated in the claims that follow.

In order that a clearer understanding of this invention may be had, attention is hereby directed to the accompanying drawings forming a part of this application, and illustrating certain possible embodiments of this invention, and in which:

Fig. 1 is a top view of an oil burner embodying our invention;

Fig. 2 is a front view thereof;

Fig. 3 is a vertical sectional view thereof on a larger scale, and is taken on the line 3—3 of Fig. 1. A preferred form of hearth construction is also shown, partly in section and partly broken away, in association with the burner;

Fig. 4 is a top view of the rotating cup member of the burner, the aspect being indicated by the line 4—4 of Fig. 2;

Fig. 5 is a bottom view, partly in section and partly broken away, of the burner head assembly; and Fig. 6 is a fragmentary bottom view showing a modified form of air deflecting vanes on the rotating cup.

Similar reference characters refer to similar parts throughout the several views of the drawings.

Referring to the drawings, which are understood to exemplify for purposes of illustration merely certain possible embodiments of our invention, there is shown therein an oil burner including a body comprising an annular casting having an annular bottom wall 1, an annular side wall 2, an annular top wall 3 and a vertical wall 4 extending from the inner periphery of the wall 3. This casting is formed with three bosses 5, each having a recess adapted to receive a supporting leg. Each of these legs may comprise a tubular member 6 which seats in a boss 5 and is secured in place therein by means of a set screw 7. A threaded collar 8 is secured to the lower end of tube 6 as at 9, and a threaded tube or shaft 10 extends through the collar 8 and preferably into member 6. Shaft 10 may be drawn inwardly or outwardly of the tubular member 6 and the collar 8 by adjusting a nut 11, which is in threaded engagement with the shaft 10 and is disposed beneath and supports the collar 8.

If desired, the lower end of shaft 10 may be swiveled in a foot member 12, as at 13, and an adjacent portion of the shaft 10 may be flattened, as at 14, so that the length of the leg may be varied by engaging portion 14 with a wrench or other tool and turning the shaft 10 without allowing the nut 11 to rotate.

With the leg construction just described, it will be apparent that the burner may be raised and lowered and leveled readily and easily while at the same time, a firm and sturdy support is provided; also that the legs can be quickly and easily attached and detached.

An electric motor, indicated at 15, or other operating device for the burner, is suspended from the burner body by means of bolts or screws 16, which penetrate lugs 17 formed on the housing of the motor 15, and engage in threaded perforations formed therefor in the wall 1 of the body casting, as at 18. The motor shaft 19 extends upwardly through the central aperture in bottom wall 1 of the burner body and is disposed within the space encompassed by the annular wall 2.

The rotating head of the burner is mounted on the motor drive shaft 19 for rotation therewith. This head is made up of several parts secured together. There is an inner member having a circular tapered stem which at its lower end 20 has an aperture adapted to snugly receive the drive shaft 19 and to be securely attached thereto by means of set screw 21. Above the portion 20 the stem is enlarged as at 22 and has a hollow of generous size. Above the portion 22, the annular wall and hollow of the stem taper outwardly, as at 23. Extending outwardly from the top of the stem is a horizontal annular portion 24.

An annular cup member is secured to the underside of portion 24 adjacent its periphery, as by means of screws 25, which penetrate perforations in the portion 24 and engage in threaded perforations provided in bosses 26 formed on the upper edge 27 and vertical rim 28 of the cup member. Rim 28 is cut through at certain places, as at 29, to form centrifugal discharge apertures. Viewed in relation to the direction of rotation of the cup member, the leading wall 30 of each aperture 29 is disposed somewhat tangentially, and the trailing wall 31 is approximately radial, the apertures being widest toward the center of the cup.

Extending downwardly and inwardly from the edge 27 is an annular wall or spreader surface 32, which is somewhat convex in vertical section. The lower end of spreader portion 32 curves upwardly, forming an annular vertical wall 33 surrounding but spaced an appreciable distance from the stem portion 22 and forming a trough 34 intermediate the portions 32 and 33.

A boss 35 is also formed in the body casting. This boss has a horizontal oil duct or passage 36 formed therein extending from the outside of the main casting to a vertical oil duct or passage 37 in the boss and which is open at the top thereof. A pipe 38 is screwed, or is otherwise fastened, in the passage 37 and extends between the stem portion 22 and the spreader wall 33 and has its upper end 39 bent over so that its outlet is directly above the oil trough 34.

A band 40 of thin material, such as sheet metal, is placed about the side wall 2 of the body. This band may comprise a strip of sheet metal having its ends 41 bent outwardly and brought into abutment and secured together by means of bolts 42, thus forming a hand hold whereby the band may be moved about the body. Preferably, the outer surface of body wall 2 is recessed to accommodate this band.

This band and the wall 2 of the body are provided with a plurality (for instance, three) of corresponding apertures, the apertures in the band being indicated at 43 and the apertures in the wall 2 at 44. By adjusting the band on the body the openings into the body may be enlarged or reduced, the band thus constituting a shutter for these openings.

A thumb screw 45 is threaded into the outer end of the duct 36 and serves as a removable cleaning plug therefor. This screw has a head 46 which overlaps a portion of the shutter 40, so that by tightening the screw 45, the shutter may be bound against the wall 2 of the body and thus the shutter may be locked in place. Preferably, the shutter is provided with a shoulder 46' which is adapted to strike and to be stopped by the shank of screw 45 so as to prevent the air ports into the body from being completely closed.

A passage 47 through the bottom of the body casting communicates with the passage 36 in the boss 35, and a connection 48, adapted to be connected with a source of liquid fuel supply (not shown) to lead the fuel into the burner, is secured in this passage 47.

If desired, a plate of heat insulating material 49, such as asbestos, may be secured over the top of the burner head. The attachment may be made by means of the screws 25, for which the asbestos plate is provided with suitable perforations.

Preferably, a hearth of refractory material is associated with the burner. As shown in Fig. 3, this hearth comprises an annular vertical wall 50, which extends from about the level of the wall 3 of the body of the burner upwardly to some distance above the rotating head. There is also a horizontal layer or surface 51 of refractory heat-insulating material which is laid over the portion 3 of the burner, embraces the vertical wall 4, and extends from the annular wall 4 of the burner to the refractory wall 50. In practice, the refractory wall 50 may be conveniently disposed within or against the sides of the combustion chamber of the boiler, or hot water or hot air heater, with which the burner is associated.

The operation of a burner having the construction just described is as follows: The burner head is rotated at high speed by the motor. Oil is caused to flow by gravity, or by any other suitable means, through the connection 48, through passages 47, 36 and 37, and through pipe 38, so as to flow into the trough 34 of the head. The centrifugal force due to the rotation of the head and the slope of the spreader 32 causes the oil to creep up the spreader and to be discharged in the form of a horizontal sheet of spray through the apertures 29, with sufficient force and momentum to cause the horizontal sheet of oil spray, so discharged, to impinge against the refractory wall 50.

The shutter 40, having been adjusted to establish the proper opening of the air ports into the burner, the centrifugal action of the rotating burner head causes air to be sucked in through these ports, and to sweep about the stem of the burner head, and through the space between the stem and the wall 33 and to be discharged through the apertures 29. The simultaneous discharge of this air with the oil spray causes intermingling of this air and oil spray to a certain extent.

Vanes 52 are provided on the underside of the cup member about its edge, the vanes extending at a slight angle to radial. These vanes are located above the top of the burner body wall 4. When the burner head rotates, these vanes will draw air up through the interior of the burner and between the spreader 32 and the wall 4, and will project it outwardly in the form of a horizontal sheet with sufficient momentum and velocity to cause the sheet to impinge against the refractory wall 50. This sheet of air acts as an air cushion for the horizontal sheet of oil spray which is projected immediately above this sheet of air, and serves to carry the sheet of oil spray along with it to the wall 50, where both the air sheet and the oil spray sheet impinge and thereby become thoroughly intermingled.

Suitable means, such as a gas pilot flame (not shown) disposed adjacent the refractory wall 50, is provided to ignite the sprayed liquid fuel in the presence of the projected air. In view of the fact that the intimate intermixing of the air and oil spray takes place in the neighborhood of the refractory wall 50, combustion will take place close to this wall. After operating for a short time, the refractory wall 50 will become very highly heated, and this heat will enhance the vaporizing of the oil and the intermixing of the fuel with the combustion supporting air.

If desired, fins or vanes 53 may be provided on the under surface of the portion 24 of the inner member of the burner head, the purpose being to enhance the volume and speed of the air stream flowing about the stem of the head and to aid the mixing of this air with the discharging oil spray.

If desired, instead of having the vanes 52 of the head end flush with the edge 27 of the head, these vanes, such as 54, may project outwardly beyond the periphery of the head, as shown in Fig. 6.

It will be apparent that all of the vital parts of the burner are also otherwise well protected and insulated from being damaged or impaired by the heat of the combustion. Copious quantities of air are constantly drawn into the air chamber in the burner body, and volumes of cool air constantly circulate around the stem, thus preventing heat from being conducted to the drive shaft by the walls of the stem. When the head is rotating, centrifugal force will cause the air in the hollow of the stem to be concentrated in the flaring hollow at the top and thus a heat insulating vacuum will be established immediately over the drive shaft, thus preventing heat from gaining access to the drive shaft from within the stem. However, instead of leaving the hollow of the stem empty, it may be filled with suitable heat insulating material, such as asbestos, if desired. The asbestos cover plate 49 also shields the top of the burner head from the heat of combustion, and this obviously also further opposes the passage of heat to the motor shaft.

The shield of heat insulating material 51 of the hearth also prevents heat from attacking those parts of the burner which are beneath it. Further, the space beneath the surface 51 is cooled by the air that is circulating therethrough on its way to enter the air ports of the burner. The motor is in this space and is subject to this cooling air circulation.

The oil trough is shielded from the intense heat of combustion by the wall 4 and also by the cool air passing between the wall 4 and the spreader and also by the cool air passing between the trough and the stem 22, and also is further protected by being located beneath the hearth level.

It will be noted that by mounting and supporting the rotating head directly on the drive shaft, all mechanical bearings between the head and drive shaft are eliminated. At the same time the head is readily and easily adjustable on the shaft.

The formation of the oil duct in a boss of the body casting avoids the necessity of pipe fittings, attains rigidity and simplicity, renders cleaning a simple matter, and permits the use of a thumb screw which has the triple function of serving as a plug for the oil duct, of serving as a limiting device for movement of the shutter, and of serving as means whereby the shutter may be locked in adjusted position.

The simplicity of the construction, and the ease with which the burner may be raised, lowered, leveled, and assembled and knocked down is readily apparent and needs no further comment.

As many changes may be made in the above construction and as many apparently widely different embodiments of this invention could be made without departing from the scope thereof, it is to be understood that all matter contained in the above description or shown in the accompanying drawings shall be interpreted as illustrative and not in a limiting sense.

What we claim is:

1. In a burner of the character described, in combination, a hollow body having a vertical wall having air port apertures and an integral boss extending inwardly from said wall, said boss having an oil duct passage extending from the outside of said wall, a thumb-screw engaged in outer end of said oil duct, an adjustable shutter for said apertures, said shutter comprising an apertured band encircling said wall and circumferentially adjustable thereon, said thumb-screw extending through an aperture of said band, and means, comprising a shoulder on said band adapted to engage said screw, whereby movement of said shutter to completely close said air port apertures is prevented.

2. In a burner of the character described, in combination, a hollow body having a vertical wall having air port apertures and an integral boss extending inwardly from said wall, said boss having an oil duct passage extending from the outside of said wall, a thumb-screw engaged in outer end of said oil duct, an adjustable shutter for said apertures, said shutter comprising an apertured band encircling said wall and circumferentially adjustable thereon, said thumb-screw extending through an aperture of said band, and means, comprising a shoulder on said band adapted to engage said screw, whereby movement of said shutter to completely close said air port apertures is prevented, said thumb-screw having a collar overlapping said shutter from the outside, whereby the shutter may be locked in adjusted position.

JOHN C. KORTH.
GEORGE IRVING CARTER.